Figure 1:
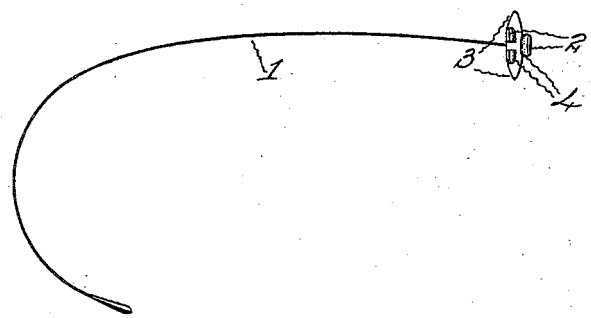

No. 617,242. Patented Jan. 3, 1899.
C. A. ETHERINGTON, Sr.
EYEGLASS ATTACHMENT.
(Application filed Oct. 8, 1898.)

(No Model.)

Witnesses:
E. J. Hyde.
C. E. Buckland.

Inventor:
Charles A. Etherington Sr.
by Harry R. Williams
atty.

THE NORRIS PETERS CO., PHOTO-LITHO., WASHINGTON, D. C.

UNITED STATES PATENT OFFICE.

CHARLES A. ETHERINGTON, SR., OF HARTFORD, CONNECTICUT.

EYEGLASS ATTACHMENT.

SPECIFICATION forming part of Letters Patent No. 617,242, dated January 3, 1899.

Application filed October 8, 1898. Serial No. 693,005. (No model.)

*To all whom it may concern:*

Be it known that I, CHARLES A. ETHERINGTON, Sr., a citizen of the United States, residing at Hartford, in the county of Hartford and State of Connecticut, have invented certain new and useful Improvements in Eyeglass Attachments, of which the following is a specification.

This invention relates to a holding means which may be quickly attached to and removed from any eyeglasses, whereby such eyeglasses, which are usually retained in position for service by the frictional grip of a nose-piece, may be held in place positively after the manner of spectacles.

Combined eyeglasses and spectacles having bows permanently secured to eyeglass-frames in such manner that the bows may be folded up out of the way when not needed have been provided, spectacle-bows have been attached by screws to eyeglass-frames so as to convert eyeglasses into spectacles, spectacle-bows have been permanently secured to the lenses of eyeglasses by cement without the assistance of screws, and spectacle-bows have been permanently secured to lenses by a clip having teeth that project into recesses formed in the lenses; but in each of these instances the connection of the bows has been practically permanent, and in every case either the lenses or the frames have to be previously prepared by the manufacturer or optician, or the user is required to employ a tool of some nature, with the consequent liability of breaking the edges of the lenses.

The object of the present invention is the production of an exceedingly simple, light, and cheap means which can be quickly attached by any one at any time to ordinary rim or rimless eyeglasses that have not been previously prepared or treated or manipulated in any manner to provide for the attachment, whereby such glasses may be made more serviceable for energetic labor or violent exercise in shop, office, or gymnastic duties or recreations, and which means can be as quickly removed and placed in the pocket when the occupation is such as to enable the use of the eyeglasses without danger of dropping and breaking the lenses.

This invention resides in a flexible bow, which at one end is curved so as to pass around and engage an ear and at the other end has lips that have their inner faces provided with cushions of sufficient elasticity and frictional grip to cling tightly to any lenses to which the bows, which are used in pairs, may be applied without marring or rendering the lenses liable to be fractured when in use.

Figure 2:
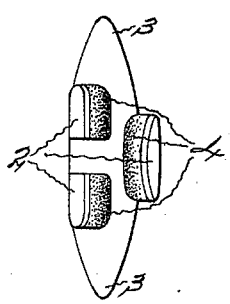
Figure 3:
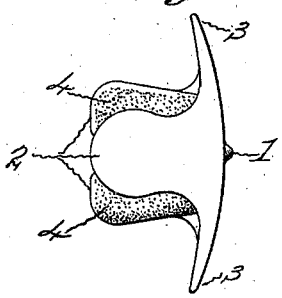
Figure 4:
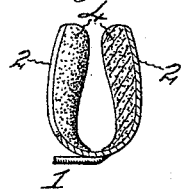

Referring to the accompanying drawings, which illustrate the invention, Figure 1 shows a view of one of the attachable and detachable bows. Fig. 2 shows a greatly-enlarged view of the bow-lips. Fig. 3 shows a view of the lips looking from the front, and Fig. 4 shows a large transverse section taken through one of the lips.

The bow may be made of any suitable material of approved shape and size. Only one bow is illustrated, for both bows of the pair which form the complete eyeglass attachment which is the subject of this invention are identical. The bow 1 is formed of round fine steel wire and is curved at one end so that it will encircle an ear. At the end opposite the curve there are attached to the bow, preferably rigidly, a number of lips 2. These lips are arranged to extend upon opposite sides of the lenses of a pair of eyeglasses. Prongs 3 are secured to the end of the bow in such manner as to extend along the edge of a lens. In the form shown there are three lips, one arranged to extend over the edge onto the outside of a lens and two arranged side by side so as to extend over the edge onto the inside of the lens. To the inside faces of these lips cushions 4 are fastened. These cushions are preferably formed of cork; but rubber or any other soft elastic material having sufficient adhesiveness to cling to the surfaces of the lens may be employed. Any desired number of rigid lips provided with the interior cushions may be utilized, and these lips may be secured to the end of the bow rigidly, as shown in the accompanying drawings, or they may be connected by such a joint as is employed in common spectacle-bows, if desired—for instance, as shown in Patent No. 450,177, of April 14, 1891.

When it is desired to utilize this attachment, the lips of the bows are merely thrust upon the lenses so as to grasp the edges between them. Then the bows may be placed over the ears, as with the ordinary spectacles. The lips attached to the lenses in this manner so firmly grasp the glass-surfaces that they cannot by ordinary means be shaken off, yet when it is desired to remove the bows the lips can be easily and quickly pulled from the lenses. These lips hold to the lenses without danger of breaking away the fragile edges, and should the cushions become worn or should the bows be required for glasses of different thickness the lips can be quickly bent, so that they may be readily attached in a manner to firmly hold in place.

The attachment forming the subject of this invention is exceedingly simple to manufacture and manipulate. It is convenient to carry, and by its employment a pair of tasteful eyeglasses that hold to the nose sufficiently for some purposes may be almost instantly transformed into less dressy but more reliable spectacles and then as quickly returned to their original condition.

With this attachment it is not necessary that the lens or eyeglass frame should be specially prepared by the manufacturer or optician with holes, recesses, or roughnesses. No cement is required and there are no screws to become loose.

I claim as my invention—

1. An eyeglass attachment consisting of a flexible wire having at one end lips arranged to extend upon opposite sides of the edge of a lens, with holding-pads of cushioning material secured to the inside faces of the lips in such manner that they will cling to the opposite faces of the lens without the aid of cement, substantially as specified.

2. An eyeglass attachment consisting of a flexible wire having at one end a curve that is adapted to rest upon and partially encircle an ear and at the other end lips arranged to extend upon opposite sides of the edge of a lens, with holding-pads of cushioning material secured to the inside faces of the lips in such manner that they will cling to the opposite faces of the lens without the aid of cement, and prongs arranged to project from the lips along the edges of the lens, substantially as specified.

3. An eyeglass attachment consisting of a clip having lips arranged to extend upon opposite sides of the edge of a lens, with holding-pads of cushioning material secured to the inside faces of the lips in such manner that they will cling to the opposite faces of the lens without the aid of cement, and prongs arranged to project from the lips along the edges of a lens, substantially as specified.

CHAS. A. ETHERINGTON, Sr.

Witnesses:
H. R. WILLIAMS,
C. E. BUCKLAND.